US007447651B1

(12) United States Patent
Herbst et al.

(10) Patent No.: US 7,447,651 B1
(45) Date of Patent: Nov. 4, 2008

(54) DIGITAL COMPUTER SYSTEM FOR OPERATING A CUSTOMIZABLE INVESTMENT FUND

(75) Inventors: Anthony F. Herbst, El Paso, TX (US); Wayne F. Perg, Amado, AZ (US)

(73) Assignee: New Market Solutions, L.L.C., Amado, AZ (US)

( * ) Notice: Subject to any disclaimer, the term of this patent is extended or adjusted under 35 U.S.C. 154(b) by 815 days.

(21) Appl. No.: 09/467,646

(22) Filed: Dec. 20, 1999

(51) Int. Cl.
*G06Q 40/00* (2006.01)
(52) U.S. Cl. .......................................... 705/36; 705/35
(58) Field of Classification Search .............. 705/30–44
See application file for complete search history.

(56) References Cited

U.S. PATENT DOCUMENTS

| | | | | |
|---|---|---|---|---|
| 4,674,044 A | | 6/1987 | Kalmus et al. .............. | 364/408 |
| 4,933,842 A | * | 6/1990 | Durbin et al. ............... | 364/408 |
| 5,126,936 A | | 6/1992 | Champion et al. .......... | 364/408 |
| 5,148,365 A | | 9/1992 | Dembo ........................ | 364/402 |
| 5,227,967 A | | 7/1993 | Bailey ........................ | 364/408 |
| 5,799,287 A | | 8/1998 | Dembo ........................ | 705/36 |
| 5,806,048 A | | 9/1998 | Kiron et al. ................. | 705/36 |
| 5,819,238 A | | 10/1998 | Fernholz .................... | 705/36 |
| 5,870,720 A | | 2/1999 | Chusid et al. ................ | 705/38 |
| 5,875,437 A | | 2/1999 | Atkins ........................ | 705/40 |
| 5,893,079 A | * | 4/1999 | Cwenar ...................... | 705/36 |
| 6,018,722 A | | 1/2000 | Ray et al. .................... | 705/36 |
| 6,029,148 A | * | 2/2000 | Zurstrassen ................. | 705/36 |
| 6,078,904 A | * | 6/2000 | Rebane ....................... | 705/36 |
| 6,157,924 A | * | 12/2000 | Austin ........................ | 705/36 |
| 6,236,972 B1 | * | 5/2001 | Shkedy ....................... | 705/1 |
| 6,253,192 B1 | * | 6/2001 | Corlett et al. ................ | 705/36 |
| 6,338,047 B1 | * | 1/2002 | Wallman .................... | 705/36 |
| 6,411,939 B1 | * | 6/2002 | Parsons ...................... | 705/36 |
| 6,601,044 B1 | * | 7/2003 | Wallman .................... | 705/36 |

FOREIGN PATENT DOCUMENTS

WO  PCT/US99/05010  5/1999

OTHER PUBLICATIONS

Morris et al., "Your Guide to Understanding Investing", published bylightbulb Press Inc., year, 1999.*
Herbst, Anthony F. and Nicholas O. Ordway. "Stock Index Futures Contracts and Separability of Returns." *The Journal of Futures Markets*, vol. 4, No. 1, pp. 87-102 (1984).
Hill, Joanne M. and Humza Naviwala. "Synthethic and Enhanced Index Strategies Using Futures on U.S. Indexes." *The Journal of Portfolio Management*, May 1999, pp. 61-74.

(Continued)

*Primary Examiner*—Frantzy Poinvil
(74) *Attorney, Agent, or Firm*—Peter K. Trzyna, Esq.

(57) ABSTRACT

A computer-aided method for operating a customizable investment fund, the method includes receiving, at a central computer, first digital signals from a first computer specifying a custom set of investments for a fund; receiving, at the central computer, second digital signals from a second computer specifying a custom set of investments for the fund; generating, at the central computer, digital signals for acquisition of investments consistent with the first digital signals and the second digital signals; entering transaction data, at the central computer, reflecting the acquisition of said investments; and outputting a separate accounting for each said set of investments within the fund.

55 Claims, 13 Drawing Sheets

OTHER PUBLICATIONS

McGinn, Daniel. "The Ultimate Guide to Indexing." *Bloomberg*, Sep. 1999, pp. 66-83.

Miller, Todd and Timothy S. Meckel. "Beating Index Funds with Derivatives." *The Journal of Portfolio Management*, May 1999, pp. 75-87.

Herbst, Anthony F., Joseph P. McCormack, Elizabeth N. West. "Investigation of Lead-Lag Relationship between Spot Stock Indices and Their Futures Contracts." *The Journal of Futures Markets*, vol. 7, No. 4, pp. 373-381 (1987).

PIMCO Funds. "PMCO Stocks Plus Fund." (Aug. 19, 1999) 12 pages, http://www.pimcofunds.com.

Risk Watch, http://www.algorithmics.com/products/riskwatch1.html.

* cited by examiner

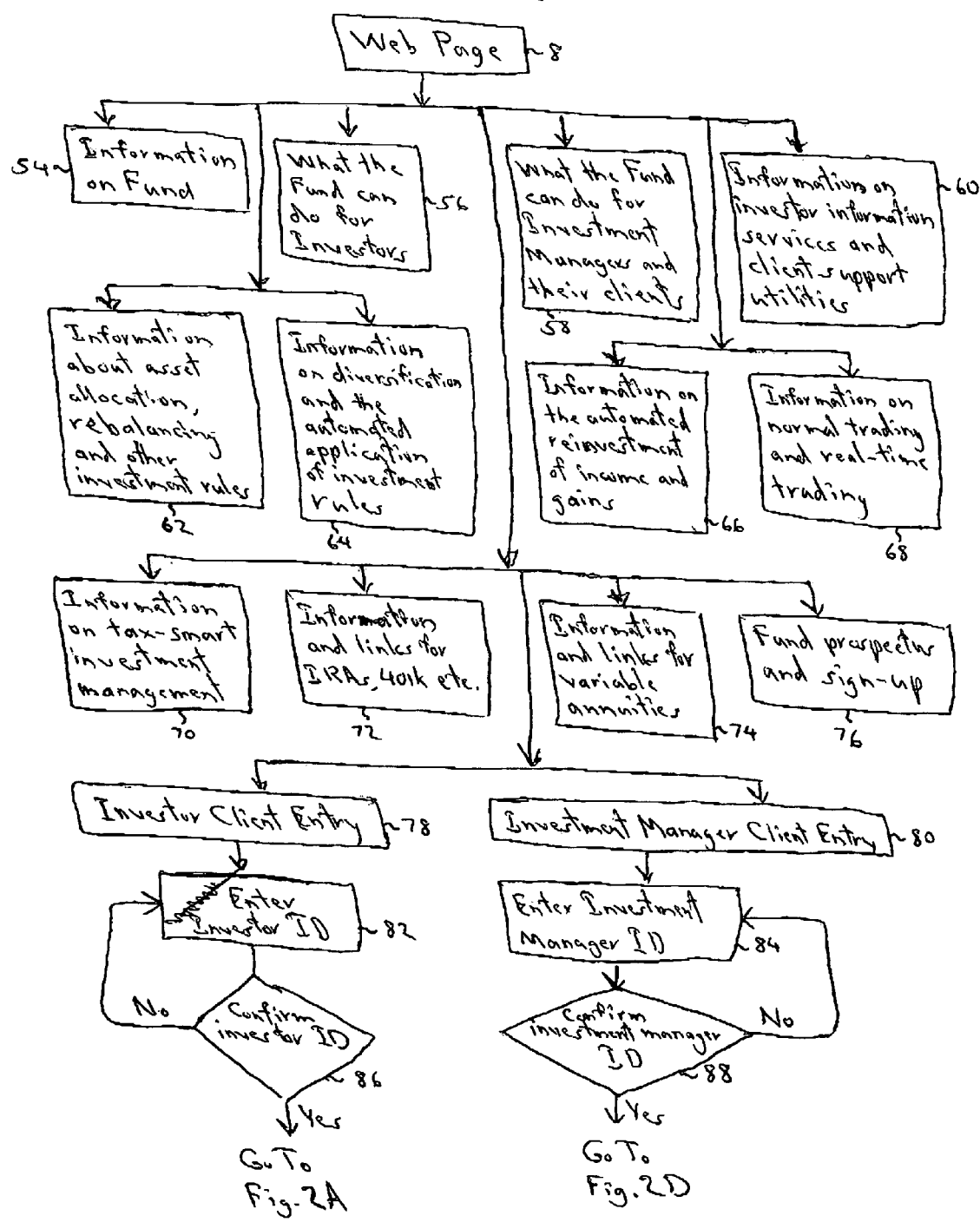

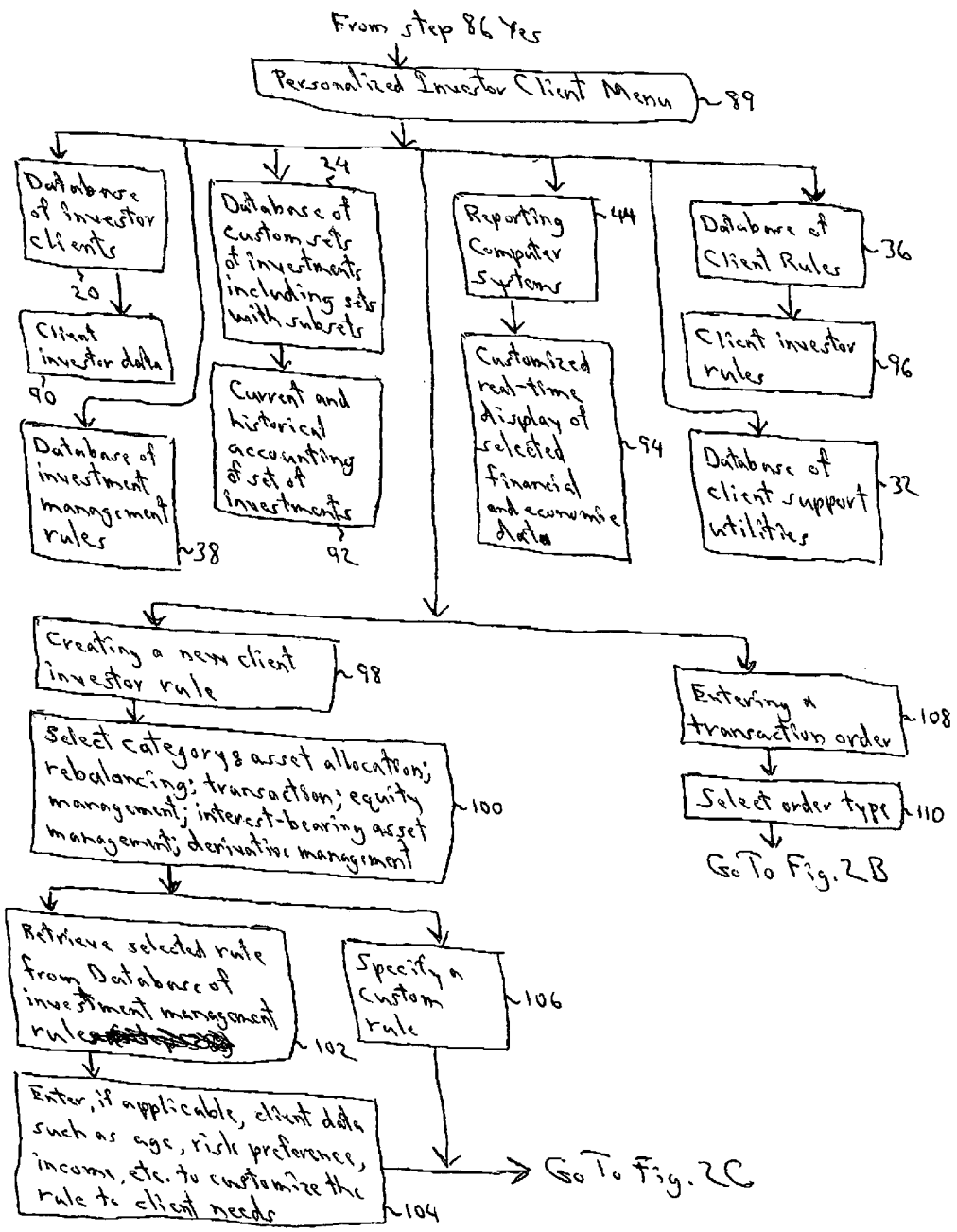

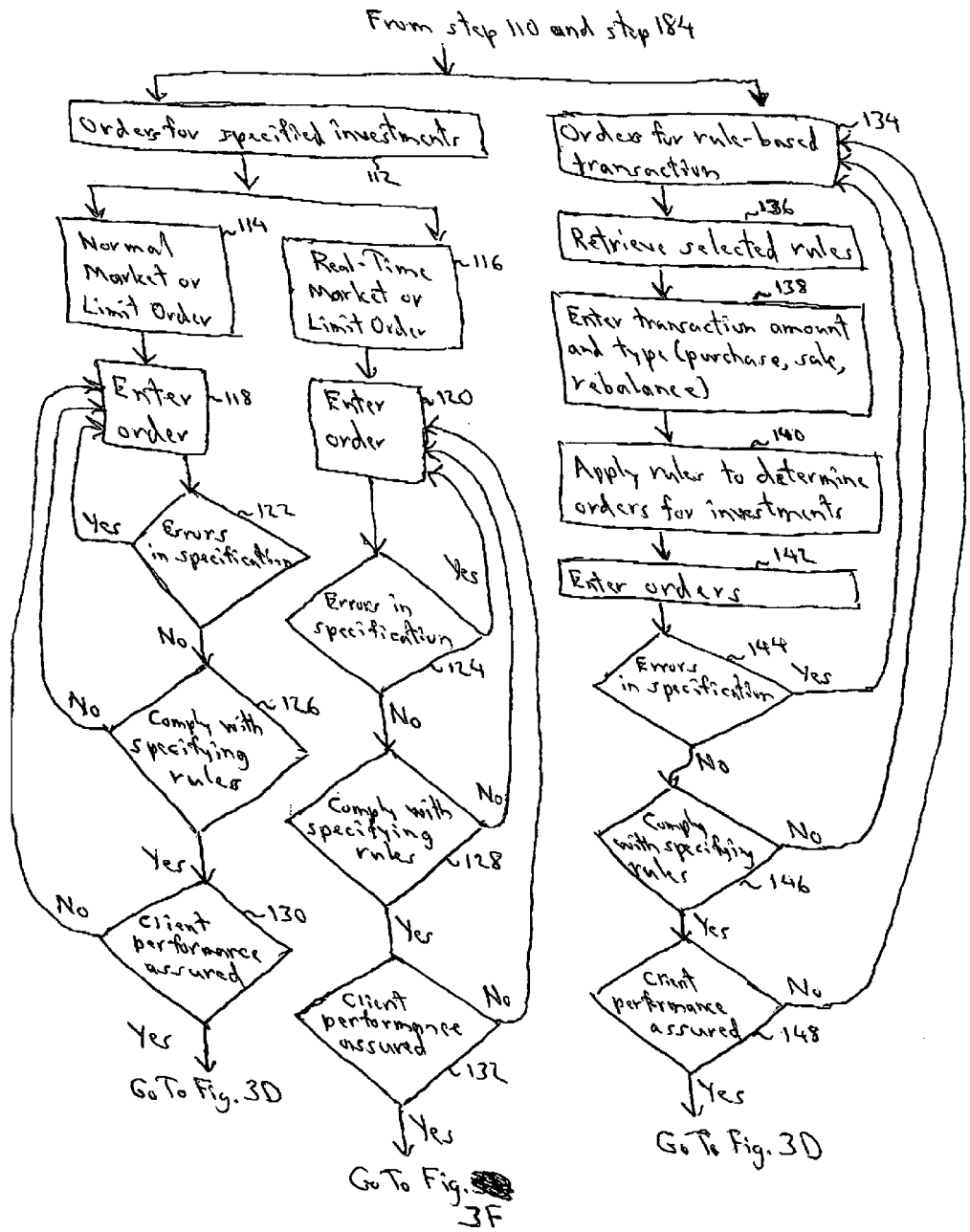

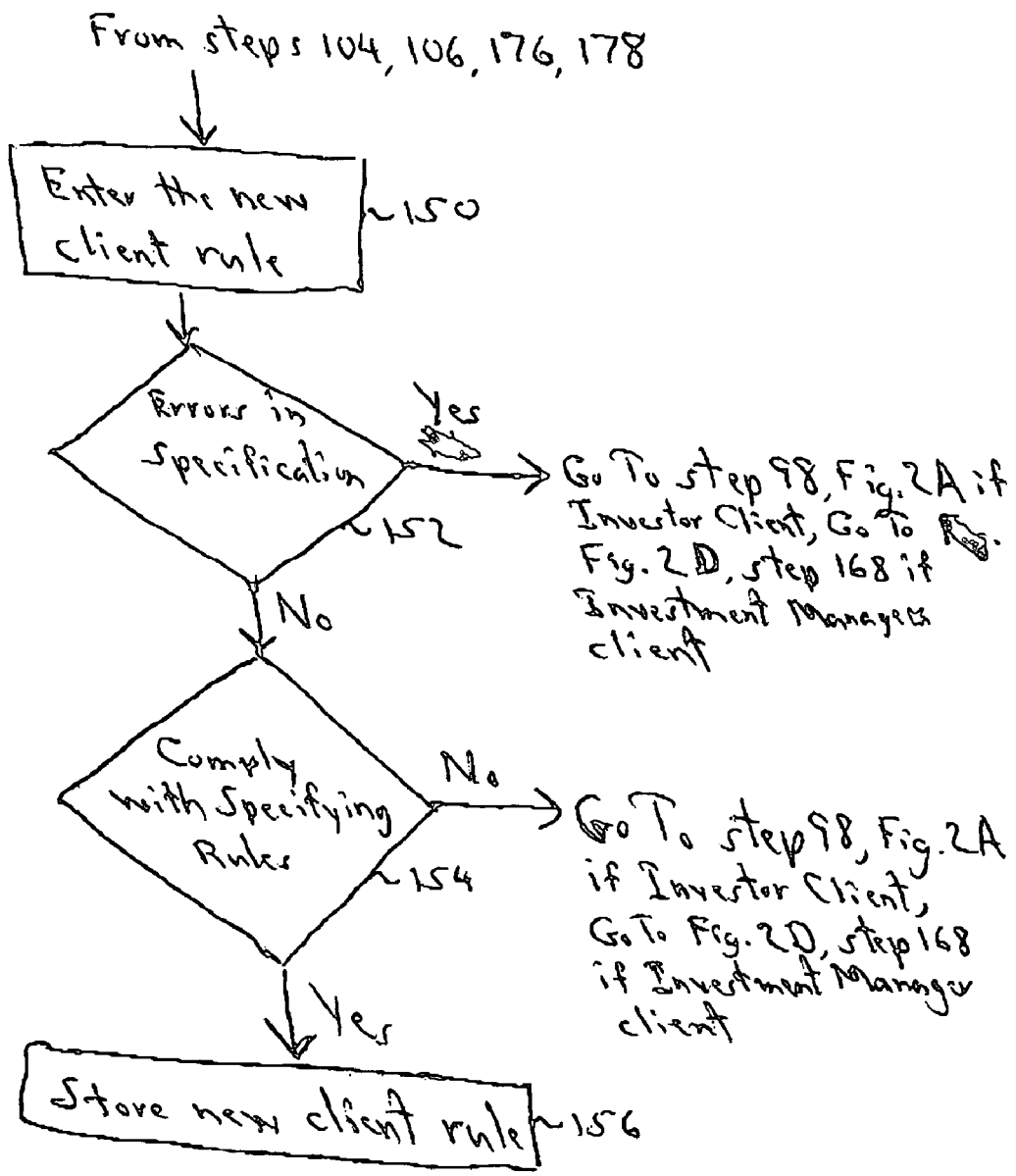

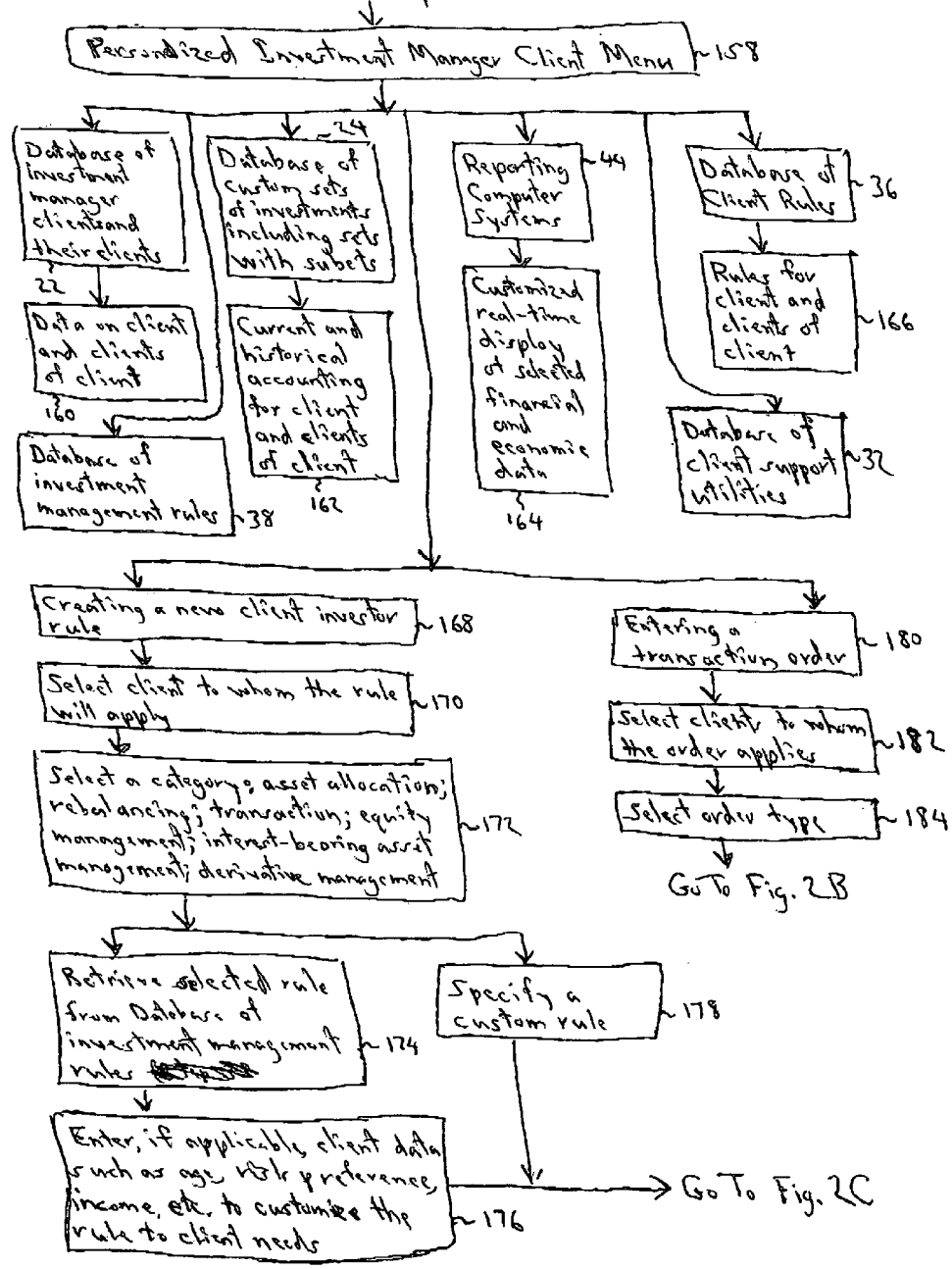

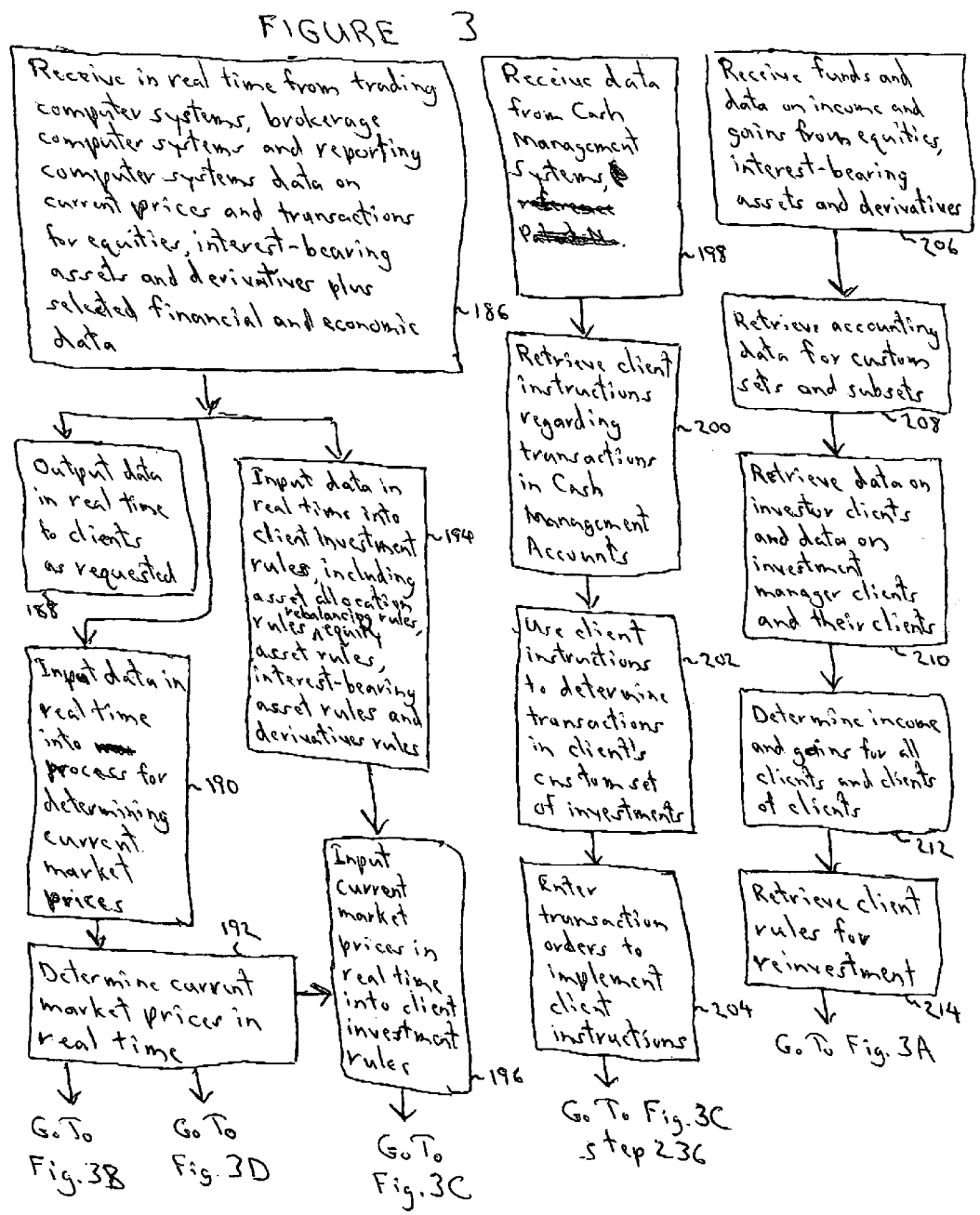

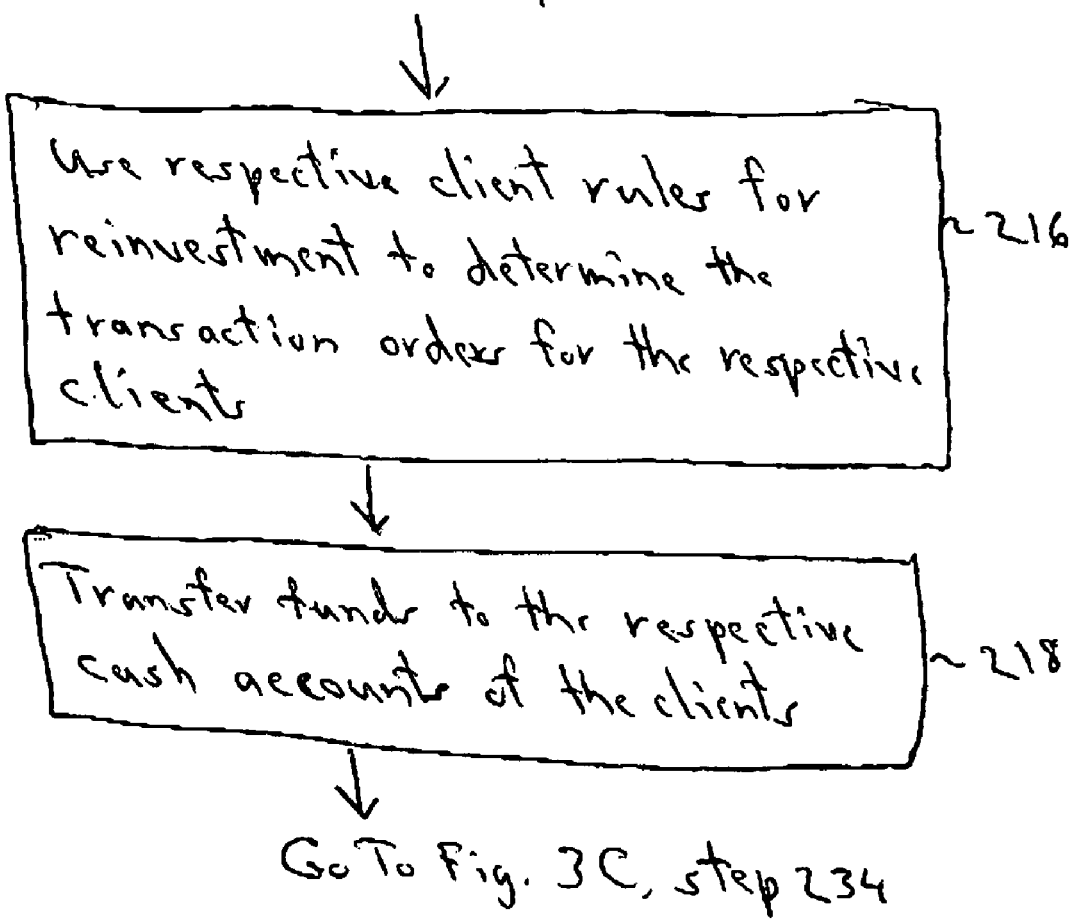

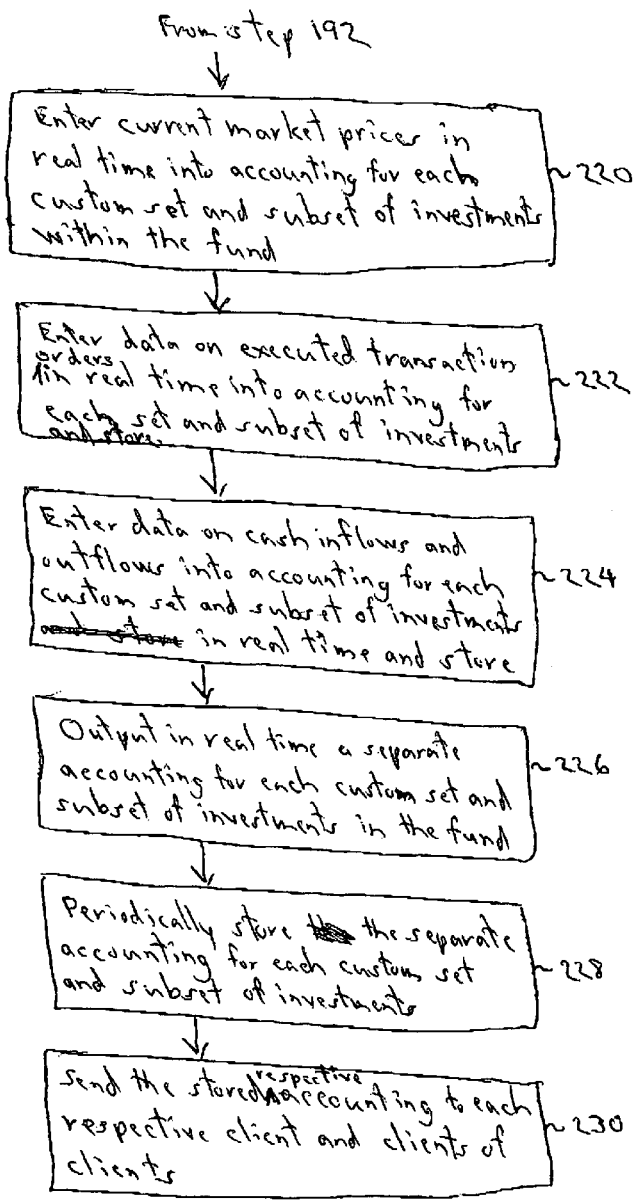

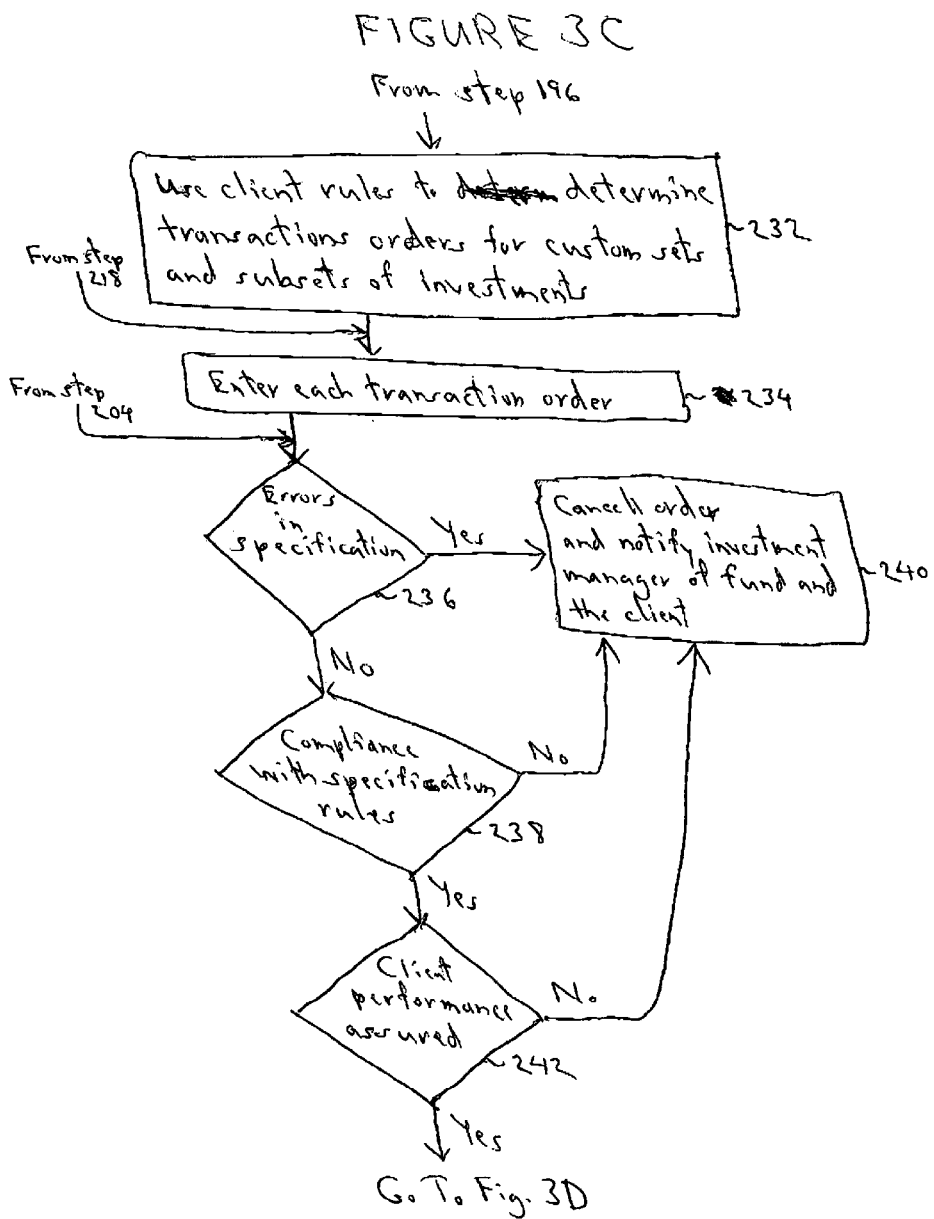

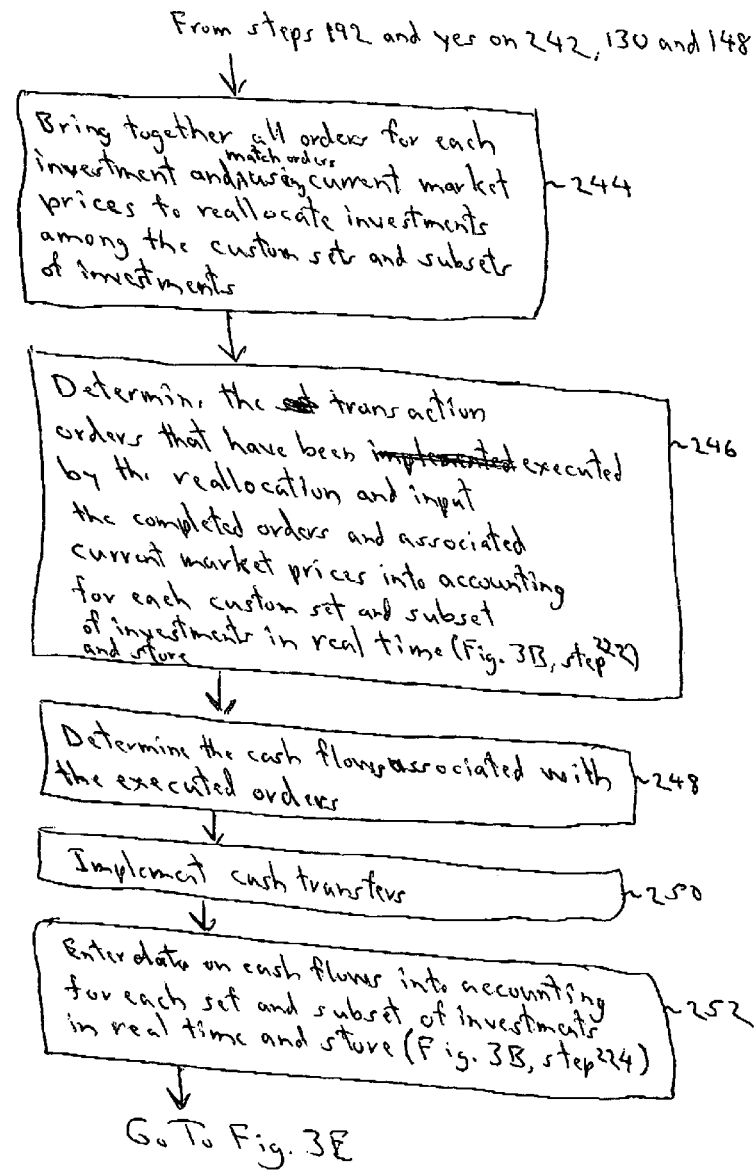

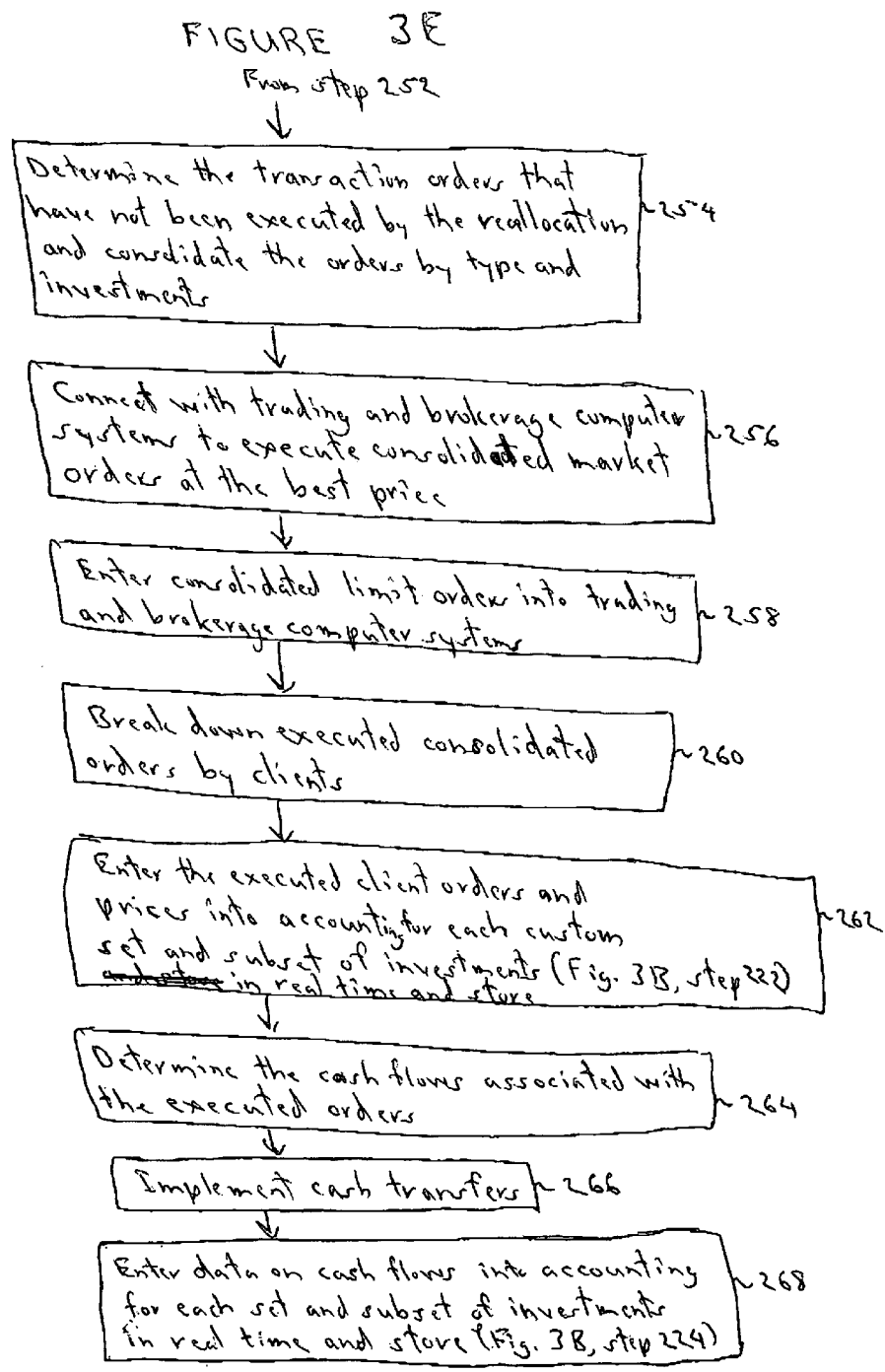

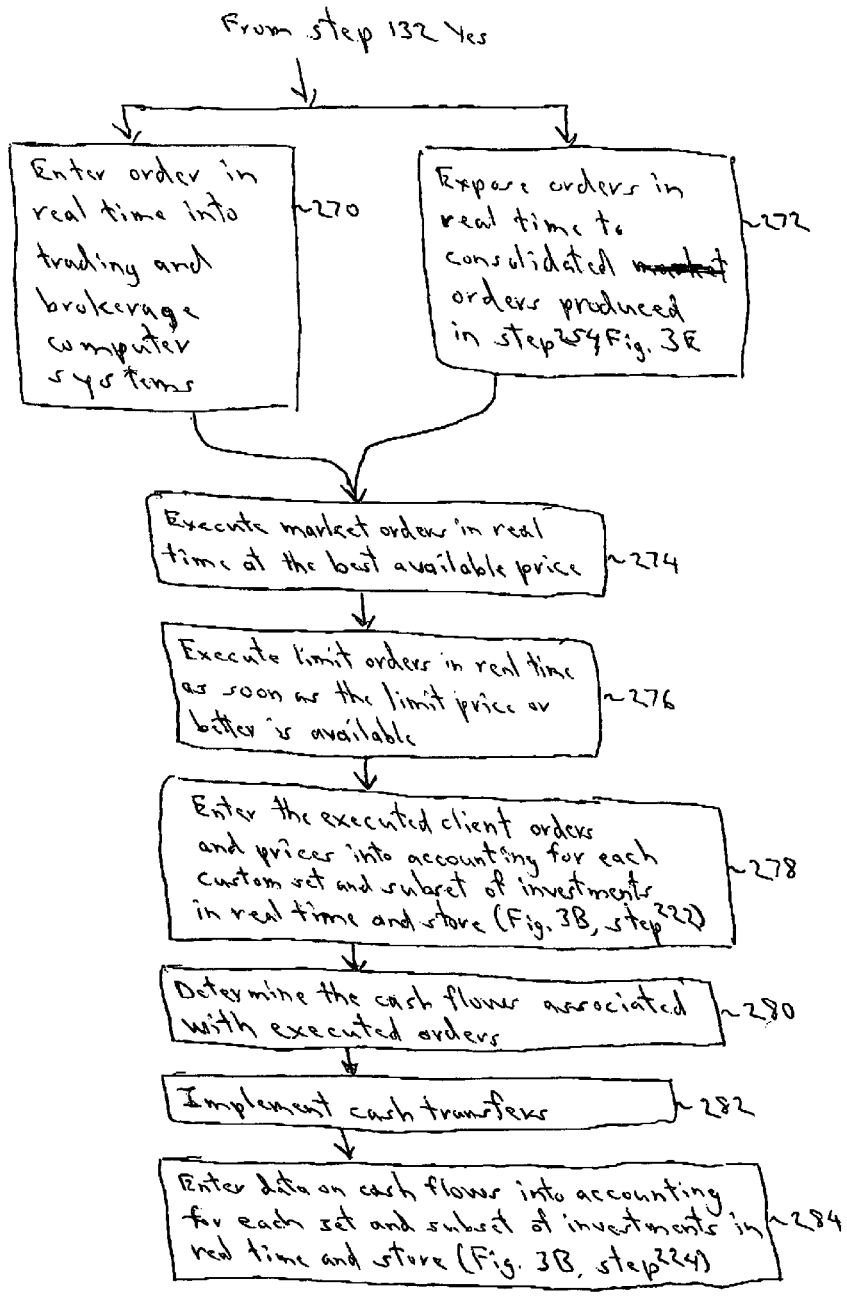

DIGITAL COMPUTER SYSTEM FOR OPERATING A CUSTOMIZABLE INVESTMENT FUND

I. FIELD OF THE INVENTION

The present invention pertains to an electrical digital computer machine and a data processing system, methods involving the same and products produced thereby, as well as data structures and articles of manufacture pertaining thereto, and necessary intermediates, involving computerized aspects of financial fields. More particularly the present invention pertains to operating and managing a customizable investment fund, creating and servicing customized holdings of investments for investors in the fund, and the like. Even more particularly, this invention relates to a digital electrical data processing system for operating and managing a customizable investment fund, including aiding in purchasing and managing custom sets and subsets of investments for investors in the fund.

II. BACKGROUND OF THE INVENTION

The investment company industry has grown approximately 100 fold over the last two decades. According to the Investment Company Institute, total assets under management for the industry rose from $55.9 billion at the end of 1978 to $5,525.2 billion at the end of 1998.

As a result of this rapid growth, the industry is now the largest manager of investment funds for US citizens. The number of registered investment funds now exceeds the number of stocks listed on the major exchanges.

The fundamental structure of the industry has not changed during this period of rapid growth. In particular, investment decision making for each fund is still centralized in a management company that runs the fund or in the fund itself. As a result, all investors in a fund share in the same investments and the same investment decision making. Accordingly, investors in a fund cannot expect investment decision making to be tailored to their individual needs, and investment decision making is not under their control.

A new fund management company, StockJungle.com, has just launched a new fund the last week in November 1999 called Community Intelligence Fund, and visitors to the company's Web site can suggest new holdings to the fund's portfolio manager, thus creating what is believed to be a first in the industry—offering investors and mere visitors to the Web site an opportunity to possibly exert a very limited influence on what is otherwise still a centralized, investment decision making of the fund.

The centralized, one-size-fits-all investment decision making of investment funds is not a good fit with the unique investment needs of individual investors. The investment needs of investors are a function of a large number of variables including current age, planned retirement age, tax factors, number and ages of children, expected retirement age, desired retirement income, expected education cost per child, current and expected future income, current wealth, current and expected future savings, desired amount to bequeath to heirs, desired amounts of charitable gifts, risk preference, risk tolerance, investment expertise, time available for managing investments, desire to manage investments and enjoyment derived from managing investments.

Tax factors can be an especially important source of difficulty when investing in present investment funds. When a fund realizes gains, all investors in the fund are taxed on their portion of the gain—whether or not they have actually participated in the gain on which they are being taxed. Taxation of "phantom" gains often occurs when investors purchase shares in a fund with significant unrealized gains. The new investors in the fund pay a price for their shares that includes the unrealized gains. Therefore, when the fund realizes the gains and passes the realized gains through to current investors the new investors must pay tax on "phantom gains"— gains that the fund realized but in which they did not participate because they paid the appreciated price rather than the lower original cost when they purchased their shares in the fund.

Another tax problem with the centralized investment management of present investment funds is that the decision on the amount and timing for the realization of gains is out of the control of the investors in the fund. As a result, investments in funds that are held in taxable accounts can be tax-inefficient for investors. In response to this problem, funds have been formed that attempt to maximize tax efficiency by minimizing the amount of gains that are realized. However, funds that minimize the realization of gains build up large amounts of unrealized gains, creating the potential of large amounts of "phantom" capital gains for future investors. Also, investors are still unable to control the timing of the realization of gains, which can be very important in tax management.

In addition, any capital losses realized by present funds cannot be passed through to investors, they must be carried forward within the fund and applied against future capital gains realized by the funds. As a result of this and of the centralized control of investment decision making, investors in funds are largely denied the opportunity to realize losses in order to offset them against gains elsewhere.

Investing directly in stocks, bonds and other investments restores control over investment decision making to individual investors and their investment advisors. This direct control allows investors to invest in a manner consistent with their unique individual investment goals and consistent with their personal tax situation. However, direct investment creates an investment performance and/or investment safety problem that is unavoidable for all but the wealthiest investors—the inability to economically achieve adequate diversification to maintain investment risk at acceptable levels.

The ability of diversification to significantly reduce risk without reducing the return on investment is a centerpiece of modern investment theory. In the absence of adequate diversification investors can minimize the risk of ruin only by limiting investment to the safest investments (e.g., government bonds and government guaranteed certificates of deposit). However, the safest investments have the lowest returns and restricting investments to the safest investments significantly reduces investment performance.

The difficulty of maintaining adequate diversification in direct investment is further increased by considering the need to invest current cash flows, both from savings and from investment income, in diversified investments in a timely fashion. Because these current cash flows are (except for investors beginning with very low wealth positions) much smaller than the total portfolio amount, only very small amounts of each investment can be purchased when the cash flows are spread over a diversified selection of investments. Therefore, even relatively wealthy investors may face difficulty in efficiently maintaining adequate diversification of direct investment portfolios.

Investment funds are the vehicle that has allowed virtually all individual investors to efficiently achieve adequate diversification. Investment funds aggregate the investments of large numbers of individual investors, making it possible for individual investors to efficiently invest in a diversified manner. The problem for individual investors is that gaining the ability to efficiently diversify by investing in current investment funds means accepting centralized investment decision making that is only partially consistent with their unique individual investment needs.

III. SUMMARY OF THE INVENTION

A. Summary

The inventors of this invention have provided a solution to this situation by creating a computerized process that makes it possible for the fund to offer individual investors and/or their investment advisors the ability to purchase individually customized and (assuming that the investor so chooses) diversified sets of investments within a customizable investment fund. The invention makes possible a customizable investment fund that can offer individual investors both the diversification that they require for combining safety with high investment performance and the personal control over their investment decisions needed to best meet their unique individual investment needs and efficiently manage their taxes.

The effect of the present invention is to bring to investment companies the shift from mass production (with its centralized control of the composition of output) to mass customization (customer control of the composition of output with little or no increase in production cost per unit) that is transforming the business of manufacturing. However, the processes that make up the present invention are quite different and distinct from the processes that have been developed to facilitate mass customization in the manufacturing business.

The processes of the present invention must be very different than the processes used to facilitate mass customization in manufacturing because financial products are fundamentally different than manufactured goods and, therefore, are produced by fundamentally different processes than are manufactured goods.

Manufactured goods are produced by employing the tangible and intangible assets of the firm to transform purchased inputs into the final product. The assets of the firm are financed by the liabilities of the firm but, except for this financing function, the liabilities of the firm have nothing to do with the products of the manufacturing business.

In contrast, the financial products of a financial firm are the liabilities of the financial firm. The deposits produced by a depository institution are the liabilities of the depository institution. The insurance policies produced by an insurance company are the liabilities of the insurance company. The investment interests produced by an investment company are the liabilities of the investment company.

The fact that the financial products of financial firms are the liabilities of the financial firms is the reason that financial firms are much more highly regulated than other types of firms. The welfare of the customers of financial firms depends on the continued financial health of the firm that produced and sold the product. And because the products of an investment company are the company's liabilities, the process of mass customization for an investment company is fundamentally different than the process of mass customization for a manufacturing firm.

A preferred embodiment of the present invention enables investors to specify custom sets of investments that meet their unique needs either by selecting the actual investment assets and amounts or by specifying a custom set of investment rules together with an amount to be invested or by some combination of custom specifying rules and selection of actual investment assets and amounts. If the custom set of investments is specified in whole or in part by a custom set of rules, the rules must be applied to the available set of investments in order to select the actual investment assets and amounts.

The application of the custom rule set can be carried out by human decision making or by a digital computer system or by a combination of the two. If the individual investor desires that to use human decision making, either alone or together with the assistance of a digital computer system, to apply his/her custom rule set, the inventors believe that the human decision making needed to meet the unique investment needs of the client will best come from the client or the client's personal investment manager.

However, the application of custom sets of rules by a digital computer system is most efficiently carried out by the central computer system of the customizable investment fund. The central computer system of the fund can most efficiently apply the rules because it can input the market data needed to apply the rules, apply the rules, derive the transactions orders and enter the orders into the system, all in one unified process in real time. Therefore, an important enhancement of the present invention is the inclusion of a process by which the central computer system of the fund applies custom rule sets to determine transactions for and manage custom sets of investments for clients.

Investment rules are a necessary component of a disciplined approach to investment that aims to meet certain defined investment goals for the investor. A complete set of rules includes rules for asset allocation, rules for rebalancing, rules for the investment in equities, rules for the investment in interest-bearing assets, rules for the use of derivatives, and rules for reinvestment of investment income.

Rules for asset allocation and rebalancing are especially important because studies demonstrate that asset allocation and rebalancing determine the largest part of investment performance. However, investment funds with centralized investment decision making generally to not address asset allocation. Most present investment funds invest only in specified asset classes. Investors and/or their investment advisors can handle asset allocation by investing specified amounts in selected funds in various categories (and that will, hopefully but not necessarily, maintain investment decision making that keeps them in that category). However, even if the desired asset allocation is achieved initially, it is often not maintained because no one is assigned the task of the necessary rebalancing and it gets lost in the shuffle of investment decision making.

The customizable investment fund made possible by the present invention will enable individual investors to put all of their investments—equities, interest-bearing assets and derivatives—in one fund with their own custom asset allocation, thus keeping asset allocation more visible and under control. In addition, investors and/or their investment managers will have the option of entering asset allocation and rebalancing rules into the central computer of the fund to automatically maintain the desired asset allocation. Given that asset allocation is the single largest determinant of investment performance (and risk), the inventors of the present invention expect that the improved control over asset allocation will produce large benefits for the investor.

The inventors of the present invention believe that investors who choose to have the central computer apply custom sets of rules to manage their custom sets of investments will benefit both from significantly reduced investment management costs (computerized application of investment rules greatly reduces the amount of skilled, and expensive, human expertise required to manage investments) and, assuming wisely selected rules, from better performing investments that better meet their investment needs (see the quantitative studies of rule-based investing in *What Works on Wall Street: A Guide to the Best Performing Investment Strategies of All Time*, James P. O'Shaughnessy, McGraw-Hill, 1998). Therefore, a preferred embodiment of the invention includes a database of investment rules and back-test results from which investors can choose and further customize according to their needs and utilities for testing their own custom rules.

B. Objects

In view of the foregoing, it is an object of the present invention to provide a computer-aided method for operating a customizable investment fund.

It is a further object of the present invention to provide a computer system for receiving, at a central computer, first digital signals from a first computer specifying a custom set of investments for a fund.

It is another object of the present invention to provide such a computer system for receiving, at the central computer, second digital signals from a second computer specifying a custom set of investments for the fund.

It is still another object of the present invention to provide such a computer system for generating, at the central computer, digital signals for acquisition of investments consistent with the first digital signals and the second digital signals.

It is yet another object of the present invention to provide such a computer system for entering transaction data, at the central computer, reflecting the acquisition of said investments.

It is yet still another object of the present invention to provide such a computer system for outputting a separate accounting for each said set of investments within the fund.

It is an additional object of the present invention to provide such a computer system for generating digital signals for acquisition of equity asset investments.

It is still an additional object of the present invention to provide such a computer system for generating digital signals for acquisition of interest-bearing assets.

It is yet an additional object of the present invention to provide such a computer system for generating digital signals for acquisition of derivatives.

It is also an object of the present invention to provide such a computer system for checking for errors made in said specifying.

It is yet also an object of the present invention to provide such a computer system for respectively testing said digital signals specifying a custom set of investments to ensure compliance with specifying rules.

It is nonetheless also an object of the present invention to provide such a computer system for testing carried out with one of said rules limiting composition of the set of investments.

It is however also an object of the present invention to provide such a computer system for testing carried out with one of said rules limiting a minimum amount of any of said investments.

It is yet an additional object of the present invention to provide such a computer system for receiving subsets of the set of investments and outputting an accounting for each subset.

It is also an object of the present invention to provide such a computer system for specifying first client rules for the set of investments and storing the first client rules.

It is yet also an object of the present invention to provide such a computer system for receiving, at the central computer, a new transaction order from at least one of said first and second computers, for changing the set of investments such that the fund is a dynamically ongoing fund.

It is nonetheless also an object of the present invention to provide such a computer system for retrieving the stored first client rules in implementing the new transaction order with changed investments.

It is however also an object of the present invention to provide such a computer system for receiving, at the central computer, digital signals from one of said first and second computes specifying automatic reinvesting of client income and client capital gains using the stored client rules.

It is yet an additional object of the present invention to provide such a computer system for receiving, at the central computer, digital signals from one of said first and second computers specifying rebalancing using the stored client rules.

It is a further object of the present invention to provide such a computer system for specifying periodic rebalancing.

It is another object of the present invention to provide such a computer system for entering a function of at least one from a group consisting of a market condition and a change in a market condition to trigger the rebalancing.

It is still another object of the present invention to provide such a computer system for changing investments in one of said sets in response to a client transaction in a cash management account system.

It is yet another object of the present invention to provide such a computer system for specifying second client rules and storing the second client rules.

It is still another object of the present invention to provide such a computer system retrieving the stored second client rules to implement a subsequent transaction order while maintaining said investments corresponding to said new transaction order under said first client rules.

It is an additional object of the present invention to provide such a computer system for selectably applying one of said first client rules and said second client rules to control reinvesting client income and client capital gains.

It is yet an additional object of the present invention to provide such a computer system for rebalancing one of said sets of investments using the second client rules.

It is also an object of the present invention to provide such a computer system for entering, at the central computer, current market prices for investments.

It is yet also an object of the present invention to provide such a computer system for entering current market prices, in real time, for the investments at the central computer to facilitate said accounting.

It is a further object of the present invention to provide such a computer system for reallocating one of said investments from one said set to another said set at current market prices and responsive to respective buy and sell signals from said first and said second computers, wherein said reallocating does not include said fund buying or selling said one investment.

It is another object of the present invention to provide such a computer system for performing the accounting in real time.

It is still another object of the present invention to provide such a computer system for performing implementing in real time.

It is yet another object of the present invention to provide such a computer system for carrying out implementing is subject to a limit order.

It is yet still another object of the present invention to provide such a computer system for performing generating in real time.

It is an additional object of the present invention to provide such a computer system for receiving with a web page intermediate said first and said second computers and said central computer.

It is still an additional object of the present invention to provide such a computer system for connecting the central computer to a trading computer system to implement said acquisition of said investments.

It is yet an additional object of the present invention to provide such a computer system for connecting the central computer to a brokerage computer system to implement said acquisition of said investments.

It is also an object of the present invention to provide such a computer system for receiving carried out with one of said first and said second computers being an investment manager computer system, said investment manager computer system connected to an investment manager client computer terminal for communicating investment management data.

It is yet also an object of the present invention to provide such a computer system for connecting the central computer to a reporting computer system to provide data on potential investments to said first and said second computer systems.

It is nonetheless also an object of the present invention to provide such a computer system for connecting the central computer to an insurance company computer system in funding a variable annuity.

It is however also an object of the present invention to provide such a computer system for connecting the central computer to a banking computer system in making a funds transfer.

It is nevertheless also an object of the present invention to provide such a computer system for connecting the central computer to a funds transfer computer system in making a funds transfer.

It is yet an additional object of the present invention to provide such a computer system for receiving a selection from a set of investment management rules provided by said central computer for managing said corresponding set of investments.

It is still an additional object of the present invention to provide such a computer system for receiving a selection is carried out with a web page intermediate said central computer and one of said first and said second computers.

It is however also an object of the present invention to provide such a computer system for receiving data for at least one parameter from a group consisting of client age, client risk preference, client retirement age, client income, client investment amount, client target retirement income, and an asset allocation percentage, to make the selection at the central computer.

It is nonetheless also an object of the present invention to provide such a computer system for receiving a selection determining allocation of funds between classes of investments.

It is nevertheless also an object of the present invention to provide such a computer system for receiving instructions for managing said corresponding set of investments to match an index.

It is yet an additional object of the present invention to provide such a computer system for receiving instructions for managing equity asset investments.

It is still an additional object of the present invention to provide such a computer system for receiving instructions for managing interest-bearing assets.

It is nevertheless also an object of the present invention to provide such a computer system for receiving instructions for managing derivatives.

The inventors herein have sought to attain these and other objects by providing an automated data processing system to manage a customized investment fund. This customized fund offers investors the ability to: 1) tailor custom sets of investments to meet their unique individual investment needs; 2) manage their investments for tax efficiency; 3) efficiently reinvest current investment income and gains on investments into custom sets of investments; 4) efficiently invest current savings into custom sets of investments; and 5) to accomplish the foregoing while efficiently maintaining diversification sufficient to minimize risk of ruin and combine high investment returns with a reasonable level of risk.

In addition to the above, a preferred embodiment of the invention includes the use of the central computer system to manage rule-based investments for investors in the fund (for the purposes of this invention, a fund is defined as a set of investments managed by a central computer system, regardless of the legal form of organization of the fund and regardless of whether legal ownership of the securities held by the fund belongs to the fund or to the entities that own the custom sets of investments in the fund). Offering investors and/or their investment advisors the ability to manage their custom sets of investments using customized rules rather than by specifying specific investments enables the investors to more easily and cost-effectively manage their custom sets of investments for the purpose of meeting their unique individual investment needs.

The use of rules to determine transactions creates an investment discipline that evidence suggests (see *What Works on Wall Street: A Guide to the Best Performing Investment Strategies of All Time*, James P. O'Shaughnessy, McGraw-Hill, 1998) can improve investment performance. The use of rules that are implemented by computer, as in the case of the present invention, can also significantly reduce the costs of managing investments (the expense ratios of large mutual funds that are managed through the use of computerized rules, such as the Vanguard 500 Index Fund, are as low as 0.18% of assets—about one fifth of the expense ratio of a typical large mutual fund managed by human decision makers rather than by computerized investment rules), thus further improving investment performance for investors.

In addition, rules for investment are a necessary intermediate step for going from the unique individual investment needs of an investor to orders for specific investments. By offering investors and/or their investment advisors the option of entering orders for custom sets of investment specified by customized rules rather than orders specified by amounts of individual securities, the preferred embodiment of the invention simplifies and reduces the cost of investment management for investors and/or their investment advisors.

Further, optional rule-based investing managed by a central computer is optimal in that the central computer of a preferred embodiment has real-time access to current investment data, and, as a result, can implement the customized rules in the shortest time at the lowest cost. Managing the customized rules with the central computer also makes it possible to increase the efficiency with which client transaction orders are aggregated by the central computer. This aggregation of client transaction orders by the central computer is an important component of the ability of the fund to offer individual investors the ability to manage their own custom sets of investments while still maintaining the diversification required to minimize risk of ruin and combine high investment returns with reasonable levels of safety.

In order to facilitate the use of rule-based investing by investors and/or their investment advisors, the preferred embodiment of the invention includes a data base of investment rules (together with data on back-tests of the rules) from which clients can select. Clients may also modify the rules obtained from the database by choosing or inserting parameters (e.g., client age, client risk preference, client retirement age, client income, client investment amount, client target retirement income, and an asset allocation percentage) in order to customize the selected rules for their own use. Clients may then use the database of client support utilities included in the preferred embodiment to back-test the selected rules for compliance with their unique individual investment needs.

The data base of investment rules in the preferred embodiment of the invention includes higher order investment rules. Higher order investment rules are similar to higher order programming languages. Selection and customization of the higher order rules controls the selection of the lower order rules that are used to actually implement the transactions. Examples of higher order rules included in the preferred embodiment include rules for managing a custom set of investments to match an index and rules for managing a custom set of investments based on inputted client data including client age, client risk preference, client retirement age, client income, client investment amount, client target retirement income, and an asset allocation percentage.

Even with the assistance of the rule-based investing supported by the preferred embodiment of the present invention, many investors will, for reasons such as lack of time, lack of expertise and/or lack of interest in investment management, choose to employ an investment advisor to manage their custom set of investments. The preferred embodiment of the invention will support the work of investment managers by maintaining a database of the clients of the investment managers and outputting accounting for the custom set of investments managed by the investment manager and the custom subsets of investments for each respective investment manager client.

As mentioned previously, asset allocation and rebalancing rules are a primary factor impacting investment performance and risk. These rules are also important in creating tax efficiency (e.g., implementing rebalancing through the allocation of reinvestment income and the allocation of funds from current savings rather than through the sale of appreciated securities). The ability of a customizable investment fund to provide customized investment allocations means that a customizable fund can offer investors the opportunity to include equity assets, interest-bearing assets and derivatives in their custom set of investments rather than limiting investments to one or two investment categories as is the case with most present investment funds.

Derivatives are an important tool for managing the volatility of a custom set of investments. Unpublished research by the inventors of the present invention demonstrates the importance of managing investment volatility over an investor's life cycle. For young investors investing regular amounts in order to fund a still distant retirement, volatility (within limits determined by the time to retirement) has a positive impact on investment performance, increasing their realized return on investment to a level exceeding the geometric mean return (the standard for measuring investment return because it is the interest rate that equates the beginning investment amount with the ending investment amount—assuming 100% reinvestment of all investment income, no withdrawals and no investment of additional funds during the time period). For retired investments, volatility is a negative because regular withdrawals will reduce the realized return on their investments well below the geometric mean return on the investments for the period.

Back-tests on actual investment data for the 1965-1995 period performed by the inventors demonstrate that an investor who retired at the beginning of 1965, putting all of his/her funds into the S&P 500 and withdrawing in equal monthly installments annual amounts with a purchasing power equal to 3.0% of the purchasing power amount of his/her beginning (1965) investment amount would have run out of money before the end of the 30 year period—and many investors can expect to live more than 30 years after retirement. This occurred even though the 3.0% real withdrawal rate is 40% less than the actual realized geometric real (purchasing power) real rate of return of 5.0% achieved by the S&P 500 over the 30 year period.

If the S&P 500 had exhibited no volatility over the 30 year period and achieved the same 5% real rate of return, then the purchasing power of the investors investments would have grown by 2% per year compounded annually rather than going to zero before the end of the 30 year period. The 3% real withdrawal rate resulted in the investor running out of money before the end of the 30 year period because the impact of the withdrawals acted on the investor's return on the volatile S&P 500 to drive down the investor's realized real rate of return to almost zero even though the geometric mean real rate of return on the S&P 500 for the period was 5%. This result demonstrates the importance for retired investors of using derivatives to reduce the volatility of stock market returns.

As mentioned previously, a key component of the management of the custom sets of investments in the preferred embodiment of the invention is the consolidation of client transaction orders by the central computer system. It is the consolidation of client transaction orders that makes it possible for clients to order smaller quantities (potentially even fractional quantities) of individual investment securities than can be transacted (if at all) at a reasonable cost in the normal secondary markets for the respective securities.

The order consolidation function of the central computer is especially important for investments in interest-bearing assets because of the large size generally required for transactions in the secondary markets for interest-bearing assets. Rule-based investing is also expected to be especially important for interest-bearing assets given the heterogeneity of interest-bearing assets of even the same issuer and the ability to effectively divide interest-bearing assets into groups of equal default and interest rate risk.

In addition to making possible diversified sets of custom investments for investors, the order consolidation process within the central computer offsets matching buy and sell client transaction orders, further reducing client costs by avoiding the costs of external market makers. In the preferred embodiment of the invention, the central computer is connected in real time to trading computers, brokerage computers and reporting computers. The resultant availability of real-time pricing data for investments enables the central computer to determine in real time the current market prices to be applied to these internal order matches. The current market price applied to these internal order matches may or may not include a bid-ask spread, depending on whether the fund charges clients for executed transaction orders by charging transactions fees, taking a bid-ask spread or both.

IV. BRIEF DESCRIPTION OF THE DRAWINGS

FIG. 2 is an illustration of a flow chart for an embodiment of the present invention;

FIG. 2A is an illustration of a flow chart for an embodiment of the present invention;

FIG. 2B is an illustration of a flow chart for an embodiment of the present invention;

FIG. 2C is an illustration of a flow chart for an embodiment of the present invention;

FIG. 2D is an illustration of a flow chart for an embodiment of the present invention;

FIG. 3 is an illustration of a flow chart for an embodiment of the present invention;

FIG. 3A is an illustration of a flow chart for an embodiment of the present invention;

FIG. 3B is an illustration of a flow chart for an embodiment of the present invention;

FIG. 3C is an illustration of a flow chart for an embodiment of the present invention;

FIG. 3D is an illustration of a flow chart for an embodiment of the present invention;

FIG. 3E is an illustration of a flow chart for an embodiment of the present invention;

FIG. 3F is an illustration of a flow chart for an embodiment of the present invention.

V. DETAILED DESCRIPTION OF A PREFERRED EMBODIMENT

Figure 1:
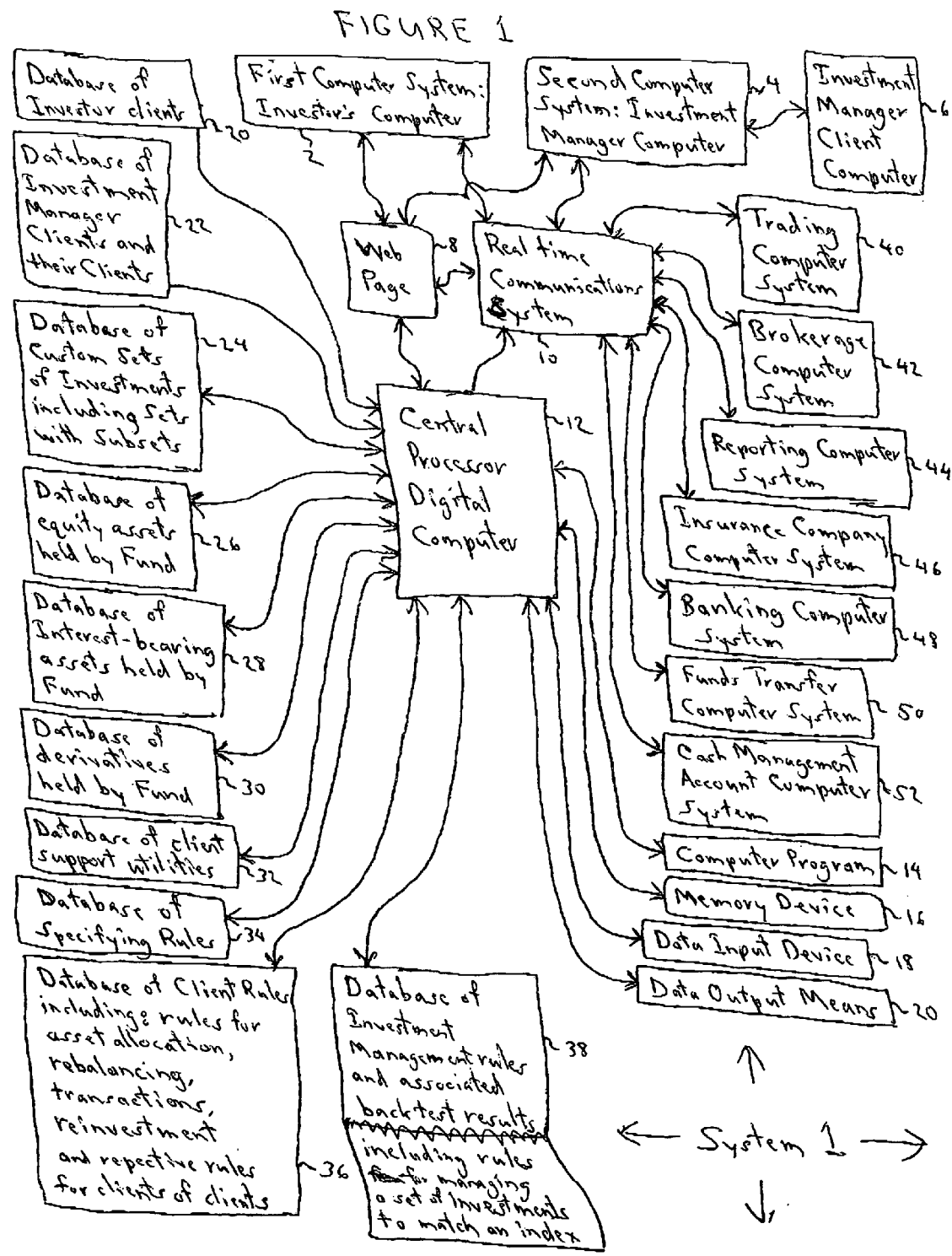
FIG. 1 is an illustration of a flow chart for an embodiment of the present invention.

Referring now to FIG. 1, an embodiment of the present invention is illustrated so as to indicate how to make and use the customizable investment fund. For the purposes of the present invention, a fund is a set of investments managed by a central computer. The fund may have any legal form of organization consistent with its purpose (economic viability requires a form of organization such that investment income and gains are not taxed at the fund level but are rather passed untaxed through to the investors in the fund, including forms such as a mutual fund, a trust, a limited liability company or a limited partnership). Title to the securities in the fund may be held by the fund entity or (subject to possible legal constraints) by the respective investors in the fund.

At the heart of the invention is at least one central digital computer 12, such as a server in a distributed network. The central digital electrical computer 12 has a memory device for storing electronic output 16, such as a hard drive, diskette and disk drive, etc. The central digital electronic computer 12 is connected to a real time communications system 10 and to a Web Page on the Internet 8, by such means as a modem. One or more first computer systems (investors' computers) 2 can link to the Web Page 8 and the real time communications system 10 to communicate with the central digital computer 12. One or more second computer systems (investment managers' computers) 4 can link to the Web Page 8 and the real time communications system 10 to communicate with the central digital computer 12. One or more investment manager clients' computers 6 can link with a second computer system (investment manager's computer) 4. Additionally, the central digital computer 12 is connected to a data input device 18, such as a keyboard, and data output means 20, such as a printer and/or monitor. The central digital electrical computer 12 is controlled by a computer program 14.

Note that the computer program 14 is preferably in software, but can alternatively be wholly or partially in hardware. A software approach, e.g., the program stored on a diskette article of manufacture, provides a useful facility for inputting or storing data structures that are produced by the computer program 14, as well as for inputting a software embodiment of the present invention. Of course, storing the computer program 14 in a software medium is optional because the same result can be obtained by replacing the computer program 14 in a software medium with the computer program 14 in a hardware storage device, e.g., by burning the computer program 14 into a ROM, using conventional techniques to convert software into an ASIC or FPGA, etc., as would be readily understood by one having a modicum of skill in the arts of computer science and electrical engineering. (It is well known in the art of computer science that it is a trivial technical exercise to go from hardware to software or vice versa. See, for example, James R. Goodman, Todd E. Marlette, and Peter K. Trzyna, "The Alappat Standard for Determining That Programmed Computers are Patentable Subject Matter," J.P.T.O.S. October 1994, Volume 76, No. 10, pages 771-786, and James R. Goodman, Todd I. Marlette, and Peter K. Trzyna, "Toward a Fact-based Standard for Determining Whether Programmed Computers are Patentable Subject Matter," J.P.T.O.S. May 1995, Vol. 77, No. 5, pages 353-367, both of which are incorporated by reference.) In this regard, it should also be noted that "input" can include inputting data for processing by the computer program 14 or inputting in the computer program 14 code itself. The software embodiment is preferable for flexibility, but these approaches are equivalent.

The computer program 14 facilitates accessing as well as using a database of investor clients 20; a database of investment manager clients and their clients 22; a database of custom sets of investments including sets with subsets 24; a database of equity assets held by the fund 26; a database of interest-bearing assets held by the fund 28; a database of derivatives held by the fund 30; a database of client support utilities 32 a database of specifying rules 34; a database of client rules, including rules for asset allocation, rebalancing, transactions, reinvestment and respective rules for clients of clients 36; and a database of investment management rules and associated back-test results, including rules for managing a set of investments to match an index 38.

One or more trading computer systems 40 may be connected to the central digital computer 12 through the real time communications system 10. One or more brokerage computer systems 42 may be connected to the central digital computer 12 through the real time communications system 10. One or more reporting computer systems 44 may be connected to the central digital computer 12 through the real time communications system 10. One or more insurance company computer systems 46 may be connected to the central digital computer 12 through the real time communications system 10. One or more banking computer systems 48 may be connected to the central digital computer 12 through the real time communications system 10. One or more funds transfer computer systems 50 may be connected to the central digital computer 12 through the real time communications system 10. One or more cash management account computer systems 52 may be connected to the central digital computer 12 through the real time communications system 10. As to cash management account computer systems 52, the following are incorporated by reference: U.S. Pat. No. 5,940,809 titled "Securities brokerage-asset management system;" U.S. Pat. No. 5,826,243 titled "Integrated system for controlling master account and nested subaccount(s);" U.S. Pat. No. 4,774,663 titled "Securities brokerage-cash management system with short term investment proceeds allotted among multiple accounts;" U.S. Pat. No. 4,376,978 titled "Securities brokerage-cash management system;" and U.S. Pat. No. 4,346,442 titled "Securities brokerage-cash management system." Note that these respective computer systems may share data with each other as well as with the central digital computer 12.

Referring now to FIG. 2, clients of the customizable investment fund first log onto the Web Page of the system 1. The menu of options on the web page 8 includes information on the fund 54; what the fund can do for investors 56; what the fund can do for investment managers and their clients 58; information on investor information services and client support utilities 60; information about asset allocation, rebalancing and other investment rules 62; information on diversification and the automated application of investment rules 64; information of the automated reinvestment of income and gains 66; information on normal trading and real-time trading 68; information on tax-smart investment management 70; information and links for IRAs, 401 k, etc. 72; information and links for variable annuities 74; fund prospectus and sign-up 76; investor client entry 78; and investment manager client entry 80.

If the user selects investor client entry 78, the system 1 requests the user to enter investor ID 82. The system 1 then checks to confirm investor ID 86. If the system 1 does not confirm the investor ID, then the system 1 goes back to step 82. If the system 1 confirms the investor ID, then the system 1 goes to FIG. 2A.

If the user selects investment manager client entry 80, the system 1 requests the user to enter investment manager ID 84. The system 1 then checks to confirm investment manager ID 88. If the system 1 does not confirm the investment manager ID, then the system 1 goes back to step 84. If the system 1 confirms the investment manager ID, then the system 1 goes to FIG. 2D.

Note that the system 1 may use technologies such as digital signatures, fingerprints and retina patterns as well as passwords for the process of entering and checking user IDs.

Referring now to FIG. 2A, from step 86 yes the investor client is referred by the system 1 to a personalized investor client menu 89. One menu item is the database of investor clients 20, through which the investor can access his/her client investor data 90 for the purpose of review and updating. Another menu item is the database of investment management rules and associated back-test results 38. A further menu item is reporting computer systems 44, through which the investor can access his/her customized real-time display of selected financial and economic data 94. Still another menu item is the database of client rules 36, through which the investor can access his/her client investor rules 96 for purpose of review and updating. A still further menu item is the database of client support utilities 32. Still another menu item is creating a new client investor rule 98. A still further menu item is entering a transaction order 108.

If the investor selects creating a new client investor rule 98, the system 1 requests the investor to select a category including asset allocation, rebalancing, transaction, equity management; interest-bearing asset management and derivative management 100. The investor then chooses to either specify a custom rule 106 or to retrieve a selected rule from the database of investment management rules 102. If the investor chooses to retrieve a selected rule from the database of investment management rules 102, the investor then enters, if applicable, client data such as age, risk preference, income, etc. to customize the rule to client needs 104. From steps 104 and 106 the system 1 goes to FIG. 2C.

If the investor selects entering a transaction order 108, the system 1 requests the investor to select the order type 110 and then goes to FIG. 2B.

Referring now to FIG. 2B, from steps 110 and 184 the system 1 requests the client to choose orders for specified investments 112 or orders for rule-based transactions 134. If the client chooses orders for specified investments 112, the system 1 then asks the client to choose normal market or limit order 114 or real-time market or limit order 116. Normal orders and real-time orders are processed differently and are subject to different specifying investments. Real-time orders will be exposed immediately to the secondary markets for the respective investments and, as a result, real-time orders must meet minimum amount and composition rules that are consistent with the operation of the respective secondary markets. Normal orders will go first to the consolidation process managed by the central digital computer 12. As a result the minimum amounts for investment can be lower than for the real-time orders and the composition must be consistent with the consolidation process managed by the central digital computer 12.

If the client chooses normal market or limit orders 114, the system 1 then requests the client to enter the order 118. The system 1 then checks the order for errors in specification 122. If the system 1 detects errors in specification, it goes to step 118. If the system 1 does not detect errors in specification, then the system 1 checks for compliance with specifying rules 126. If the system 1 determines that the order does not comply with specifying rules, then the system 1 goes to step 118. If the system 1 determines compliance with specifying rules, then the system 1 checks to see if client performance is assured 130. If the system 1 determines that client performance is not assured, then the system 1 goes to step 118. If the system 1 determines that client performance is assured, then the system 1 goes to FIG. 3D.

If the client chooses real-time market or limit orders 116, the system 1 then requests the client to enter the order 120. The system 1 then checks the order for errors in specification 124. If the system 1 detects errors in specification, it goes to step 120. If the system 1 does not detect errors in specification, then the system 1 checks for compliance with specifying rules 128. If the system 1 determines that the order does not comply with specifying rules, then the system 1 goes to step 120. If the system 1 determines compliance with specifying rules, then the system 1 checks to see if client performance is assured 132. If the system 1 determines that client performance is not assured, then the system 1 goes to step 120. If the system 1 determines that client performance is assured, then the system 1 goes to FIG. 3F.

If the client chooses orders for rule-based transaction 134, the system 1 requests the client to retrieve selected rules 136 and enter transaction amount and type (purchase, sale, rebalance) 138. The system 1 then applies the rules to determine orders for investments 140 and enter the orders 142. The system 1 then checks the order for errors in specification 144. If the system 1 detects errors in specification, it goes to step 134. If the system 1 does not detect errors in specification, then the system 1 checks for compliance with specifying rules 146. If the system 1 determines that the order does not comply with specifying rules, then the system 1 goes to step 134. If the system 1 determines compliance with specifying rules, then the system 1 checks to see if client performance is assured 148. If the system 1 determines that client performance is not assured, then the system 1 goes to step 134. If the system 1 determines that client performance is assured, then the system 1 goes to FIG. 3D.

Referring now to FIG. 2C, from steps 104, 106, 176 and 178 the system 1 requests the client to enter the new client rule 150. The system 1 then checks for errors in specification 152. If the system 1 detects errors in specification, then the system 1 goes to step 98, FIG. 2A if it is an investor client and to FIG. 2D, step 168 if it is an investment manager client. If the system 1 does not detect errors in specification, the system 1 then checks for compliance with specifying rules 154. If the system 1 finds the client rule not in compliance with specifying rules, then the system 1 goes to step 98, FIG. 2A if it is an investor client and to FIG. 2D, step 168 if it is an investment manager client. If the system 1 determines compliance, then the system 1 stores the new client rule 156.

Referring now to FIG. 2D, from step 88 yes the investment manager client is referred by the system 1 to a personalized investment manager client menu 158. One menu item is the database of investment manager clients and their clients 22, through which the investment manager client can access data on the client and clients of the client 160 for the purpose of review and updating. Another menu item is the database of investment management rules and associated back-test results 38. A further menu item is reporting computer systems 44, through which the investment manager can access his/her customized real-time display of selected financial and economic data 164. Still another menu item is the database of client rules 36, through which the investment manager can access his/her rules for the client and rules for the clients of the client 166 for purpose of review and updating. A still further menu item is the database of client support utilities 32. Still another menu item is creating a new client investor rule 168. A still further menu item is entering a transaction order 180.

If the investment manager selects creating a new client investor rule 168, the system 1 requests the investment manager to select a client to whom the rule will apply 170 and then to select a category including asset allocation, rebalancing, transaction, equity management; interest-bearing asset management and derivative management 172. The investment manager then chooses to either specify a custom rule 178 or to retrieve a selected rule from the database of investment management rules 174. If the investment rules 174, the investment manager then enters, if applicable, client data such as age, risk preference, income, etc. to customize the rule to client needs 176. From steps 176 and 178 the system 1 goes to FIG. 2C.

If the investment manager selects entering a transaction order 180, the system 1 requests the investment manager to select clients to whom the order applies 182 and then to select the order type 184. The system 1 then goes to FIG. 2B.

Referring now to FIG. 3, the system 1 receives in real time from trading computer systems, brokerage computer systems and reporting computer systems data on current prices and transactions for equities, interest-bearing assets and derivatives plus selected financial and economic data 186. The system 1 then outputs data in real time to clients as requested 188, inputs data in real time into a process for determining current market prices 190 and inputs data in real time into client investment rules, including asset allocation rules, rebalancing rules, equity asset rules, interest-bearing asset rules and derivative rules 194. After the step of inputting data in real time into a process for determining current market prices 190 (a process is needed to transform reported current market data into a single current market price for each investment because multiple markets and multiple market makers for the same investment often result in multiple reported current market prices for the same investment) the system 1 determines current market prices in real time 192. The system 1 then inputs the current market prices in real time into client investment rules 196 and then goes to FIG. 3C. From the step of determining current market prices in real time 192 the system 1 also goes to FIG. 3B and FIG. 3D.

The system 1 also receives data from cash management systems 198; retrieves client instructions regarding transactions in cash management accounts 200; uses client instructions to determine transactions orders in client's custom set of investments 202; enters transaction orders to implement client instructions 204; and then goes to FIG. 3C step 236.

The system 1 also receives funds and data on income and gains from equities, interest-bearing assets and derivatives 206; retrieves accounting data for custom sets and subsets 208; retrieves data on investor clients and data on investment management clients and their clients 210; determines income and gains for all clients and clients and clients 212; retrieves client rules for reinvestment 214; and then goes to FIG. 3A.

Referring now to FIG. 3A, from step 214 the system 1 uses respective client rules for reinvestment to determine the transaction orders for the respective clients 216; transfers funds to the respective cash accounts of the clients 218; and goes to FIG. 3C step 234.

Referring now to FIG. 3B, from step 192 the system 1 enters current market prices in real time into accounting for each custom set and subset of investments within the fund 220; enters data on executed transactions orders in real time into accounting for each set and subset of investments and stores 222; enters data on cash inflows and outflows into accounting for each set and subset of investments in real time and stores 224; outputs in real time a separate accounting for each custom set and subset of investments in the fund 226; periodically stores the separate accounting for each custom set and subset of investments 228; and sends the stored respective accounting to each respective client and clients of clients 230.

Referring now to FIG. 3C, from step 196 the system 1 uses client rules to determine transaction orders for custom sets and subsets of investments 232. From steps 218 and 232 the system 1 enters each transaction order 234. From steps 204 and 234 the system 1 checks for errors in specification 236. If the system 1 detects errors in specification it cancels the order and notifies the investment manager of the fund and the client 240. If the system 1 does not detect errors in specification, it checks for compliance with specification rules 238. If not in compliance with the specification rules, the system 1 goes to step 240. If in compliance with the specification rules, the system 1 checks to see if client performance is assured 242. If no, the system 1 goes to step 240. If yes, the system 1 goes to FIG. 3D.

Referring now to FIG. 3D, from step 192 and yes on steps 242, 130 and 148 the system 1 brings together all orders for each investment and matches orders using current market prices to reallocate investments among the custom sets and subsets of investments 244; determines the transaction orders that have been executed by the reallocation and inputs the completed orders and associated current market prices into accounting for each custom set and subset of investments in real time (FIG. 3B, step 222) and stores 246; determines the cash flows associated with the executed orders 248; implements the cash transfers; 250; enters data on cash flows into accounting for each set and subset of investments in real time and stores (FIG. 3B, step 224) 252; then goes to FIG. 3E.

Referring now to FIG. 3E, from step 252 the system 1 determines the transaction orders that have not been executed by the reallocation and consolidates the orders by type and investments 254 (the consolidation may require minor adjustments to the amounts of individual client orders and the time allowed for consolidation may vary by the trading activity in respective investments); connects with trading and brokerage computers to execute consolidated market orders at the best price 256; enters consolidated limit orders into trading and brokerage computer systems 258 (limit orders will be executed only if the specified price is reached before the orders expire); breaks down executed consolidated orders by clients and clients of clients 260; enters the executed client orders and prices into accounting for each custom set and subset of investments (FIG. 3B step 222) in real time and store 262; determines the cash flows associated with the executed orders 264; implements the cash transfers 266; and enters data on cash flows into accounting for each set and subset of investments in real time and stores (FIG. 3B step 224) 268.

Referring now to FIG. 3F, from yes on step 132 the system 1 simultaneously enters the order in real time into trading and brokerage computer systems 270 and exposes the orders in real time to consolidated orders produced in step 254 FIG. 3E 272. From steps 270 and 272 the system 1 executes market orders in real time at the best available price 274; executes limit orders in real time as soon as the limit price or better is available 276 (limit orders will not be executed if they expire or are cancelled before the limit price or better is reached); enter the executed client orders and prices into accounting for each custom set and subset of investments in real time and store (FIG. 3B step 222) 280; determines the cash flows associated with executed orders 280; implements cash transfers 282; and enters data on cash flows into accounting for each set and subset of investments I real time and stores (FIG. 3B step 224) 284.

While a particular embodiment of the present invention has been disclosed, it is to be understood that various different modifications are possible and are within the true spirit of the invention, the scope of which is to be determined with reference to the claims set forth below. There is no intention, therefore, to limit the invention to the exact disclosure presented herein as a teaching of one embodiment of the invention.

We claim:

1. A computer-aided method for operating a customizable investment fund, the method including the steps of:
   receiving, at a central computer, first digital signals from a first computer specifying a first custom set of investments for a first investor to be held within a customizable investment fund;
   receiving, at the central computer, second digital signals from a second computer specifying a second custom set of investments for a second investor to be held within the fund;
   generating, at the central computer, digital signals for acquisition of investments consistent with the first digital signals and the second digital signals;
   connecting the central computer to a brokerage computer system to implement said acquisition of said investments;
   entering transaction data, at the central computer, reflecting the acquisition of said sets of investments within the fund; and
   outputting a separate accounting for each said set of investments held within the fund for each of the investors.

2. The method of claim 1, wherein the step of generating includes generating digital signals for acquisition of equity asset investments.

3. The method of claim 1, wherein the step of generating includes generating digital signals for acquisition of interest-bearing assets.

4. The method of claim 1, wherein the step of generating includes generating digital signals for acquisition of derivatives.

5. The method of claim 2, wherein the digital signals investments includes a digital signals for acquisition of derivatives.

6. The method of claim 2, wherein the step of generating includes generating digital signals for acquisition of interest-bearing assets.

7. The method of claim 6, wherein the step of generating includes generating digital signals for acquisition of derivatives.

8. The method of claim 3, wherein the step of generating includes generating digital signals for acquisition of derivatives.

9. The method of claim 1, further including the steps of:
   checking for errors made in said specifying; and
   respectively testing said digital signals specifying a custom set of investments to ensure compliance with specifying rules.

10. The method of claim 9, wherein the testing is carried out with one of said rules limiting composition of the set of investments.

11. The method of claim 9, wherein the testing is carried out with one of said rules limiting a minimum amount of any of said investments.

12. The method of claim 1, wherein at least one of said steps of receiving includes receiving subsets of the set; and the step of outputting includes outputting an accounting for each subset.

13. The method of claim 1, wherein one said specifying includes specifying first client rules for the set of investments and storing the first client rules.

14. The method of claim 13, further including the step of receiving, at the central computer, a new transaction order from at least one of said first and second computers, for changing the set of investments such that the fund is a dynamically ongoing fund.

15. The method of claim 14, further including the step of retrieving the stored first client rules in implementing the new transaction order with changed investments.

16. The method of claim 13, further including the step of receiving, at the central computer, digital signals from one of said first and second computes specifying automatic reinvesting of client income and client capital gains using the stored client rules.

17. The method of claim 13, further including the step of receiving, at the central computer, digital signals from one of said first and second computers specifying rebalancing using the stored client rules.

18. The method of claim 17, wherein the specifying includes specifying periodic rebalancing.

19. The method of claim 17, further including the step of entering a function of at least one from a group consisting of a market condition and a change in a market condition to trigger the rebalancing.

20. The method of claim 1, further including the step of changing investments in one of said sets in response to a client transaction in a cash management account system.

21. The method of claim 15, further including the step of:
   specifying second client rules and storing the second client rules.

22. The method of claim 21, further including the steps of:
   retrieving the stored second client rules to implement a subsequent transaction order while maintaining said investments corresponding to said new transaction order under said first client rules.

23. The method of claim 21, further including the step of selectably applying one of said first client rules and said second client rules to control reinvesting client income and client capital gains.

24. The method of claim 21, further including the step of rebalancing one of said sets of investments using the second client rules.

25. The method of claim 15, further including the step of entering, at the central computer, current market prices for investments.

26. The method of claim 25, further including entering current market prices, in real time, for the investments at the central computer to facilitate said accounting.

27. The method of claim 1, further including the step of reallocating one of said investments from one said set to another said set at current market prices and responsive to respective buy and sell signals from said first and said second computers, wherein said reallocating does not include said fund buying or selling said one investment.

28. The method of claim 26, wherein the accounting is performed in real time.

29. The method of claim 26, wherein the implementing is performed in real time.

30. The method of claim 29, wherein the implementing is carried out subject to a limit order.

31. The method of claim 26, wherein the step of generating is performed in real time.

32. The method of claim 1, wherein said steps of receiving are carried out with a web page intermediate said first and said second computers and said central computer.

33. The method of claim 1, further including the step of connecting the central computer to a trading computer system to implement said acquisition of said investments.

34. The method of claim 1, further including the step of breaking down a consolidated order into the investments of each of the investors.

35. The method of claim 1, wherein one of said steps of receiving is carried out with one of said first and said second computers being an investment manager computer system, said investment manager computer system connected to an investment manager client computer terminal for communicating investment management data.

36. The method of claim 1, further including the step of connecting the central computer to a reporting computer system to provide data on potential investments to said first and said second computer systems.

37. The method of claim 1, further including the step of connecting the central computer to an insurance company computer system in funding a variable annuity.

38. The method of claim 1, further including the step of connecting the central computer to a banking computer system in making a funds transfer.

39. The method of claim 1, further including the step of connecting the central computer to a funds transfer computer system in making a funds transfer.

40. The method of claim 1, wherein one of said receiving steps includes receiving a selection from a set of investment management rules provided by said central computer for managing said corresponding set of investments.

41. The method of claim 40, wherein said step of receiving a selection is carried out with a web page intermediate said central computer and one of said first and said second computers.

42. The method of claim 41, wherein the step of receiving a selection includes receiving data for at least one parameter from a group consisting of client age, client risk preference, client retirement age, client income, client investment amount, client target retirement income, and an asset allocation percentage, to make the selection at the central computer.

43. The method of claim 40, wherein said step of receiving a selection includes receiving a selection determining allocation of funds between classes of investments.

44. The method of claim 40, wherein the step of receiving a selection includes receiving instructions for managing said corresponding set of investments to match an index.

45. The method of claim 40, wherein the step of receiving a selection includes receiving instructions for managing equity asset investments.

46. The method of claim 40, wherein the step of receiving a selection includes receiving instructions for managing interest-bearing assets.

47. The method of claim 40, wherein the step of receiving a selection includes receiving instructions for managing derivatives.

48. The method of claim 45, wherein the step of receiving a selection includes receiving instructions for managing interest-bearing assets.

49. The method of claim 45, wherein the step of receiving a selection includes receiving instructions for managing derivatives.

50. The method of claim 46, wherein the step of receiving a selection includes receiving instructions for managing derivatives.

51. The method of claim 48, wherein the step of receiving a selection includes receiving instructions for managing derivatives.

52. A computer-aided method for operating a customizable investment fund, the method including the steps of:
receiving, at a central computer, first digital signals from a first computer specifying a first custom set of investments for a first investor to be held within a customizable investment fund;
receiving, at the central computer, second digital signals from a second computer specifying a second custom set of investments for a second investor to be held within the fund;
generating, at the central computer, digital signals for acquisition of investments consistent with the first digital signals and the second digital signals, said acquisition comprising reallocating one of said investments from one said set to another said set at current market prices and responsive to respective buy and sell signals from said first and said second computers, wherein said reallocating does not include said fund buying or selling said one investment;
entering transaction data, at the central computer, reflecting the acquisition of said investments; and
outputting a separate accounting for each said set of investments held within the fund for each of the investors.

53. The method of claim 52 further including breaking down a consolidated order into the investments of each of the investors.

54. A computer system to implement an investment fund where each of a plurality of individual investors customizes a set of investments and all sets are held within the fund, the system comprising:
a central computer system;
a first computer;
a second computer;
a brokerage computer system;
wherein the central computer controlled to:
receive first digital signals from the first computer specifying a first custom set of investments corresponding to a first investor to be held within a customizable investment fund;
receive second digital signals from the second computer specifying a second custom set of investments corresponding to a first investor to be held within the investment fund;

generate digital signals for acquisition of investments consistent with the first digital signals and the second digital signals;

communicate to the brokerage computer system to implement said acquisition of said investments;

process transaction data reflecting the acquisition of said investments such that the sets of investments are within the investment fund; and output a separate accounting for each said set of investments held within the investment fund for each of the investors.

55. A computer system to implement an investment fund where each of a plurality of individual investors customizes a set of investments and all sets are held within the fund, the system comprising:

a central computer system;

a first computer;

a second computer;

a brokerage computer system;

wherein the central computer controlled to:

receive first digital signals from the first computer specifying a first custom set of investments corresponding to a first investor to be held within a customizable investment fund;

receive second digital signals from the second computer specifying a second custom set of investments corresponding to a first investor to be held within the investment fund;

generate digital signals for acquisition of investments consistent with the first digital signals and the second digital signals, whereby said acquisition comprises reallocating one of said investments from one said set to another said set at current market prices and responsive to respective buy and sell signals from said first and said second computers, wherein said reallocating does not include said fund buying or selling said one investment;

process transaction data reflecting the acquisition of said investments; and output a separate accounting for each said set of investments held within the investment fund for each of the investors.

* * * * *